US009092084B2

(12) United States Patent
Chen et al.

(10) Patent No.: US 9,092,084 B2
(45) Date of Patent: Jul. 28, 2015

(54) TOUCH CONTROL DEVICE AND METHOD FOR SAMPLING COORDINATES OF TOUCH POINT ON TOUCH PANEL

(71) Applicant: E Ink Holdings Inc., Hsinchu (TW)

(72) Inventors: Wei-Hao Chen, Hsinchu (TW); Chin-Yi Lin, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 246 days.

(21) Appl. No.: 13/899,590

(22) Filed: May 22, 2013

(65) Prior Publication Data

US 2014/0049488 A1    Feb. 20, 2014

(30) Foreign Application Priority Data

Aug. 20, 2012    (TW) .............................. 101130138 A

(51) Int. Cl.
G06F 3/041    (2006.01)

(52) U.S. Cl.
CPC .............. *G06F 3/041* (2013.01); *G06F 3/0418* (2013.01)

(58) Field of Classification Search
CPC ............................... G06F 3/041; G06F 3/0418
USPC ......................................................... 345/173
See application file for complete search history.

(56) References Cited

U.S. PATENT DOCUMENTS

| 5,790,875 | A | 8/1998 | Andersin et al. |
| 7,277,087 | B2 | 10/2007 | Hill et al. |
| 8,125,456 | B2 * | 2/2012 | Krah et al. .................... 345/173 |
| 2005/0076824 | A1 | 4/2005 | Cross et al. |
| 2006/0284857 | A1 * | 12/2006 | Oh ................................ 345/173 |
| 2010/0328239 | A1 | 12/2010 | Harada et al. |
| 2011/0050618 | A1 | 3/2011 | Murphy et al. |

FOREIGN PATENT DOCUMENTS

| CN | 101583923 A | 11/2009 |
| CN | 102200857 A | 9/2011 |
| TW | 201032115 A | 9/2010 |

OTHER PUBLICATIONS

TW Office Action that the art references were cited.

* cited by examiner

*Primary Examiner* — Viet Pham
(74) *Attorney, Agent, or Firm* — CKC & Partners Co., Ltd.

(57) ABSTRACT

A method for sampling coordinates of a touched point on a touch panel, includes the steps of: (a1) detecting a touched point at a low detection frequency to obtain two touch coordinates sequentially in time series; (a2) calculating a distance between the two touch coordinates; (a3) determining whether the distance between the two touch coordinates is greater than a first threshold distance; (a4) detecting a touched point at a high detection frequency to obtain a subsequent touch coordinate in time series; (a5) calculating a distance between two touch coordinates sequentially in time series at the high detection frequency; (a6) determining whether the distance obtained in the step (a5) is less than a second threshold distance; and (a7) detecting a touched point on the touch panel at the low detection frequency when the distance is less than the second threshold distance in the step (a6).

10 Claims, 8 Drawing Sheets

TOUCH CONTROL DEVICE AND METHOD FOR SAMPLING COORDINATES OF TOUCH POINT ON TOUCH PANEL

RELATED APPLICATIONS

This application claims priority to Taiwan Application Serial Number 101130138, filed Aug. 20, 2012, which is herein incorporated by reference.

BACKGROUND

1. Technical Field

The present invention relates to a touch control device and a method for sampling coordinates of a touched point on a touch panel.

2. Description of Related Art

In recent years, touch panels are applied in many electronic devices as input interfaces. Typical types of touch panels include resistive touch panels, capacitive touch panels, electromagnetic induction touch panels, optical touch panels and surface acoustic wave touch panels. When portable electronic devices employ touch panels, the power consumption of the touch panel is always an important concern. Many studies are focused on improvements in structures of touch panels to reduce the power consumption. However, rare researchers pay attention to the relationship between the user's customs and the frequency that touch panels detect touched points.

SUMMARY

According to one aspect of the present disclosure, a method for sampling coordinates of a touched point on a touch panel is provided. The power consumption of the touch panel may be reduced significantly by the method disclosed herein.

In one embodiment, the method includes the steps of: (a1) detecting a touched point on a touch panel at a low detection frequency to obtain two touch coordinates sequentially in time series; (a2) calculating a distance between the two touch coordinates at the low detection frequency; (a3) determining whether the distance between the two touch coordinates at the low detection frequency is greater than a first threshold distance; (a4) detecting a touched point on the touch panel at a high detection frequency to obtain a subsequent touch coordinate in time series when the distance is greater than the first threshold distance in the step (a3); (a5) calculating a distance between two touch coordinates sequentially in time series at the high detection frequency; (a6) determining whether the distance obtained in the step (a5) is less than a second threshold distance, wherein the second threshold distance is less than the first threshold distance; and (a7) detecting a touched point on the touch panel at the low detection frequency when the distance is less than the second threshold distance in the step (a6).

According to another embodiment of the present disclosure, the method includes the steps of: (b1) detecting a touched point on a touch panel at a low detection frequency to obtain two touch coordinates sequentially in time series; (b2) calculating a distance and a slope between the two touch coordinates at the low detection frequency; (b3) determining whether the distance between the two touch coordinates at the low detection frequency is greater than a first threshold distance; (b4) determining whether the slope at the low detection frequency is greater than a first threshold slope when the distance at the low detection frequency is greater than the first threshold distance; (b5) detecting a touched point on the touch panel at a high detection frequency to obtain a subsequent touch coordinate in time series when the slope at the low detection frequency is greater than the first threshold slope; (b6) calculating a distance and a slope between two touch coordinates sequentially in time series at the high detection frequency; and (b7) determining whether the distance between the two touch coordinates at the high detection frequency is less than a second threshold distance; (b8) detecting a touched point on the touch panel at the low detection frequency when the distance between the two touch coordinates at the high detection frequency is less than a second threshold distance; (b9) determining whether the slope at the high detection frequency is less than a second threshold slope when the distance between the two touch coordinates at the high detection frequency is not less than a second threshold distance; and (b10) detecting a touched point on the touch panel at the low detection frequency when the slope at the high detection frequency is less than the second threshold slope.

According to still another embodiment of the present disclosure the method includes the steps of; (c1) detecting a touched point on a touch panel at a low detection frequency to obtain a first, a second and a third touch coordinate sequentially in time series; (c2) calculating a first vector between the first coordinate and the second coordinate, a second vector between the second coordinate and the third coordinate, and an included angle between the first and the second vectors at the low detection frequency: (c3) determining whether the included angle at the low detection frequency in the step (c2) is greater than a first threshold angle; (c4) detecting a touched point on the touch panel at a high detection frequency to obtain a fourth, a fifth and a sixth touch coordinate sequentially in time series when the included angle at the low detection frequency is greater than a first threshold angle; (c5) calculating a fourth vector between the fourth coordinate and the fifth coordinate, a fifth vector between the fifth coordinate and the sixth coordinate, and an included angle between the fourth and the fifth vectors at the high detection frequency; (c6) determining whether the included angle at the high detection frequency in the step (c5) is less than a second threshold angle, wherein the second threshold angle is less than the first threshold angle; and (c7) detecting a touched point on the touch panel at the low detection frequency when the included angle at the high detection frequency is less than the second threshold angle.

According to another aspect of the present disclosure, a touch control device is provided. The touch control device includes a touch panel, a coordinate calculating unit, a track-calculating unit and a sampling control unit. The touch panel is configured to detect a touched point appeared thereon at a detection frequency to obtain a series of touch information in time series. The coordinate calculating unit is configured to calculate a series of touch coordinates in accordance with the series of touch information. The track-calculating unit is configured to calculate a distance between two touch coordinates, sequentially in time series, in the series of the touch coordinates. The sampling control unit is configured to modulate the detection frequency of the touch panel in accordance with the distance obtained by the track-calculating unit.

BRIEF DESCRIPTION OF THE DRAWINGS

The invention can be more fully understood by reading the following detailed description of the embodiments, with reference made to the accompanying drawings as follows.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as being "below" or "beneath" other elements or features would then be oriented "above" the other elements or features.

According to one aspect of the present disclosure, a method for sampling coordinates of a touched point on a touch panel is provided. The method disclosed herein may be applied in various types of touch panels such as resistive touch panels, capacitive touch panels, electromagnetic induction touch panels and optical touch panels.

Figure 1A:
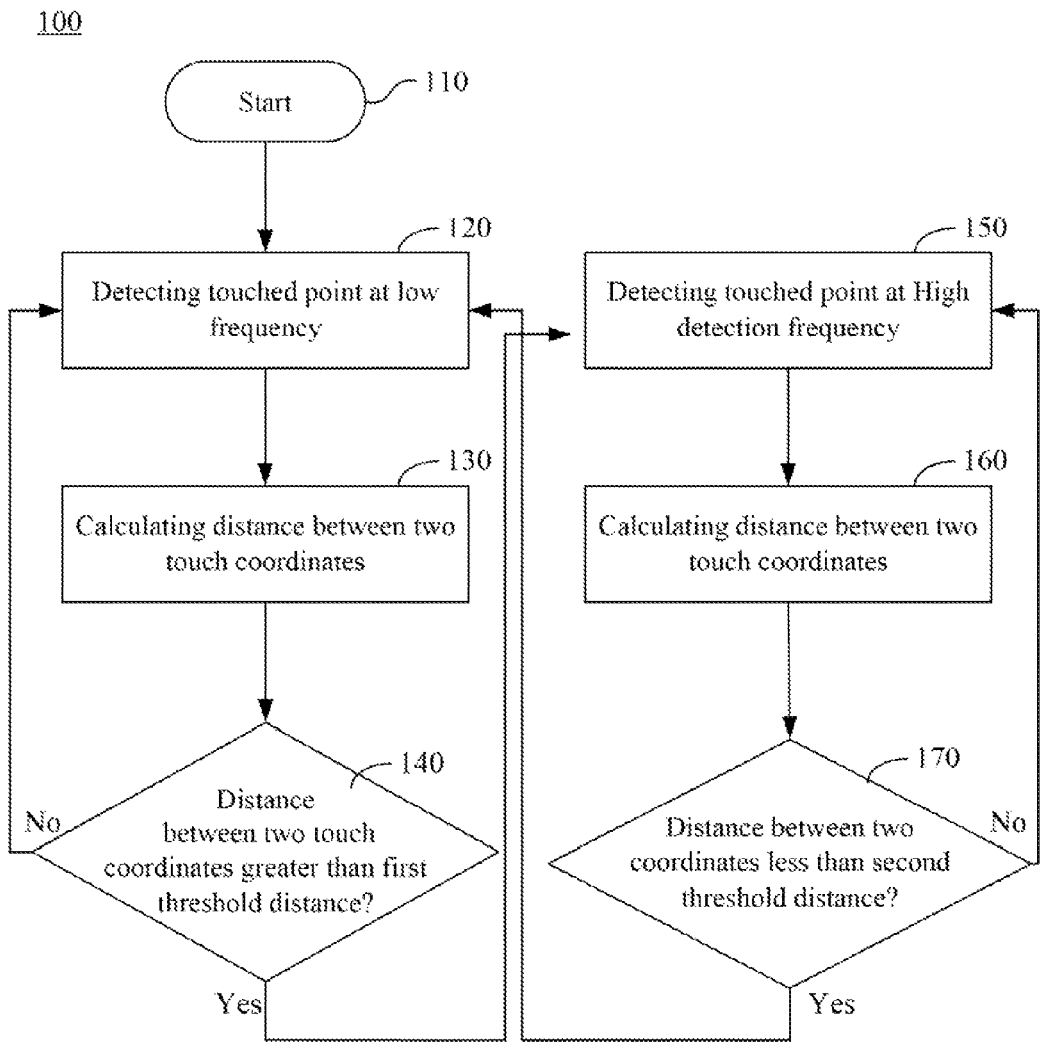
FIG. 1A is a flow chart showing a method for sampling coordinates of a touched point on a touch panel according to one embodiment of the present disclosure.
Figure 1B:
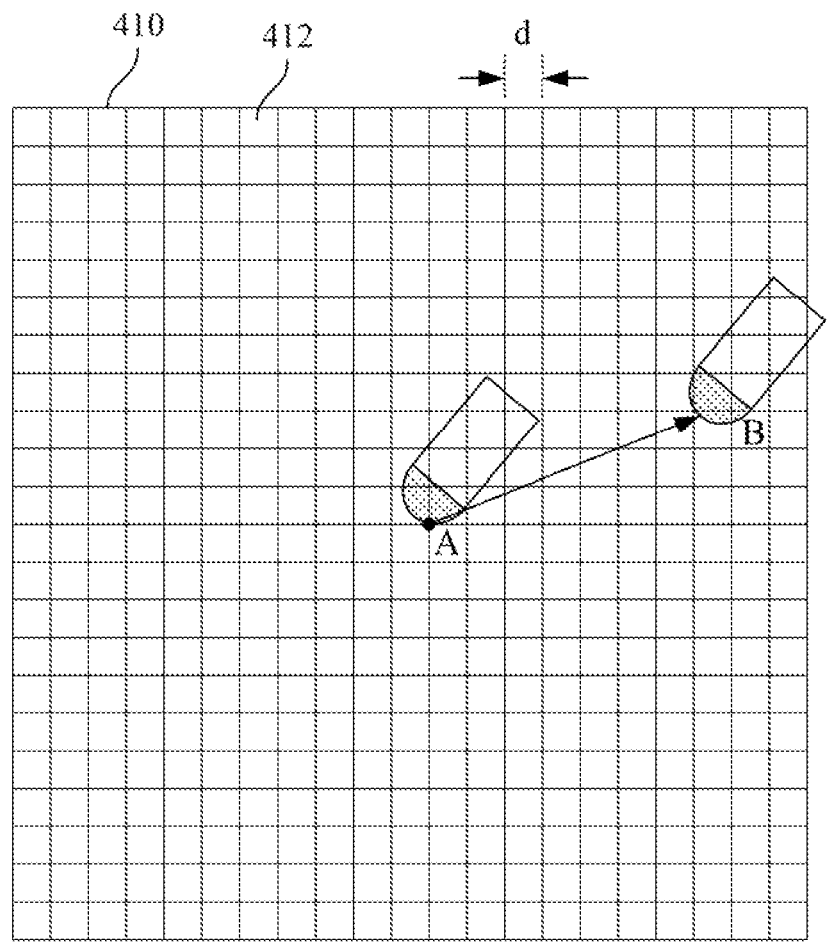
FIG. 1B is top view schematically illustrating a touch panel according to one embodiment of the present disclosure.

FIG. 1A is a flow chart showing a method 100 for sampling coordinates of a touched point on a touch panel according to one embodiment of the present disclosure. The method 100 begins at step 110, which may be, for example, a step of turning on the touch panel. FIG. 1B is top view schematically illustrating a touch panel 410 according to one embodiment of the present disclosure. The touch panel 410 typically includes a plurality of resolution units 412, which have a resolution pitch d. The term "resolution pitch" herein refers to a minimal distance that may be distinguished and identified by the touch panel. The shape of each of the resolution units 412 is non-limited. For examples, the resolution units 412 may be triangular, rectangular or hexagonal in shape. In addition, the arrangement of the resolution units is not limited to a manner of matrix construction although the resolution units 412 depicted in FIG. 1B are shown in a matrix manner.

In step 120, a touched point appeared on the touch panel 410 is detected at a low detection frequency so as to obtain at least two touch coordinates sequentially in time series. Specifically, the touched point may be moved from position A to position B as illustrated in FIG. 1B so that a number of touch coordinates may be obtained along the path AB. The germ "time series" means measurements of some physical parameter as a function of discrete time, i.e. at some pre-determined sampling time intervals, In one embodiment, the touch panel detects the position of the touched point at a low detection frequency of about 50 to about 150 times per second ($s^{-1}$), i.e. Hz, and therefore 50 to 150 touch coordinates may be obtained in one second. other words, the detection frequency refers the number of times that the touch panel detects the touched point per unit time. When a touched point is moved on the touch panel, a series of touch coordinates in time series may be obtained. For example, as illustrated in FIG. 1.C, the touch panel detects the position of the touched point at a low detection frequency at the first time point 01 and therefore obtains the touch coordinate ($x_1, y_1$). At the time point 02, the touch panel detects the position of the touched point and obtains the touch coordinate ($x_2, y_2$). When the low detection frequency is set to be 100 Hz, the time difference between the first time point 01 and the second time point 02 is about 0.01 s. The approach of detecting the position of the touched point depends on the type of the touch panel. Different types of touch panels detect the touch coordinates by different principles.

In step 130, the distance between the two touch coordinates, sequentially in time series, at the low detection frequency is calculated. For instance, after both touch coordinate ($x_1, y_1$) at the first time point 01 and touch coordinate ($x_2, y_2$) at the second time point 02 are obtained, the distance between the two touch coordinates ($x_1, y_1$) and ($x_2, y_2$) sequentially in time series is calculated. In examples, the distance H between two touch coordinates ($x_1, y_1$) and ($x_2, y_2$) may be calculated by the following formula (I):

$$H = [(x_2 - x_1)^2 + (y_2 - y_1)^2]^{1/2} \qquad \text{formula (I).}$$

In step 140, a determination is made as to whether the distance between the two touch coordinates sequentially in time series at low detection frequency is greater than a first threshold distance. Specifically, after the distance H between the two touch coordinates sequentially in time series is obtained, the distance H is compared to the first threshold distance to determine if the distance H is greater than the first threshold distance or not. The first threshold distance may be a pre-determined value, or may be modulated by users. In examples, the first threshold distance is about 5 folds to about 10 folds of the resolution pitch. For example, the first threshold distance may be 10 folds of the resolution pitch. When the distance H between the two touch coordinates sequentially in time series is greater than 10 folds of the resolution pitch, the determination in the step 140 is affirmative, and the method 100 proceeds to step 150. On the other hand, when the determination in step 140 is negative, the touch panel detects the position of the touched point at the low detection frequency continuously. For example, the method 100 proceeds back to the step 120.

When the determination in the step 140 is affirmative, the method 100 proceeds to step 150, in which the touch panel detects the touched point at a high detection frequency, and thus obtaining a subsequent touch coordinate in time series. The aforementioned step 120 to step 150 may be more particularly illustrated by FIG. 1C. When the distance between the touch coordinate ($x_1, y_1$) at the first time point 01 and the touch coordinate ($x_2, y_2$) at the second time point 02 is not greater than the first threshold distance, the touch panel detects the touched point at low detection frequency of the step 120 to obtain the next touch coordinate ($x_3,y_3$) at the third time point 03. Subsequently, the method 100 proceeds the step 130 to calculate the distance between the touch coordinate ($x_2,y_2$) of the second time point 02 and the touch coordinate ($x_3,y_3$) of the third time point 03. Thereafter, method proceeds to the step 140 to determine whether or not the distance between the touch coordinate ($x_2,y_2$) and the touch coordinate ($x_3,y_3$) is greater than the first threshold distance. When the determination in step 140 is affirmative, the method 100 proceeds to the step 150, in which the detection frequency is changed to a high detection frequency from the original low detection frequency. Furthermore, the touch panel detects the touched point at the fourth time point 04 in accordance with the high detection frequency, and thereby obtaining touch coordinate ($x_4,y_4$). In one embodiment, the high detection frequency may be about 150 to about 300 Hz. The aforementioned low detection frequency and the high detection frequency may respectively be represented as a first detection frequency and a second detection frequency, in which the second detection frequency is greater than the first detection frequency. That is, the low detection frequency is less than the high detection frequency.

Figure 1C:
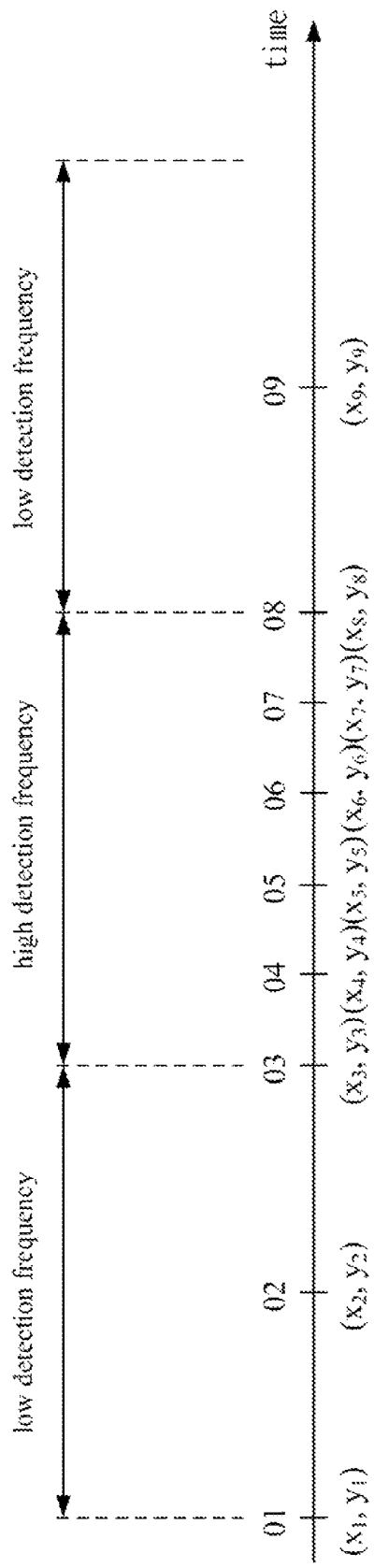
FIG. 1C is a diagram illustrating a number of touch coordinates sequentially in time series.

The method 100 proceeds to step 160 to calculate two touch coordinates sequentially in time series at the high detection frequency. For instance, as illustrated in FIG. 1C, when the touch coordinate ($x_4,y_4$) at the fourth time point 04 is obtained, the distance between the touch coordinate ($x_3,y_3$) at the third time point 03 and the touch coordinate ($x_4,y_4$) at the fourth time point 04 is calculated.

Thereafter, the method 100 proceeds to step 170 to determine whether or not the distance between the two touch coordinates in step 160 is less than a second threshold distance. It is noted that the second threshold distance is less than the first threshold distance. In one embodiment, the second threshold distance is about 2 folds to about 6 folds of the resolution pitch.

When the determination in the step 170 is negative, i.e. the distance between the two touch coordinates in step 160 is greater than or equal to the second threshold distance, the touch panel hold on detecting the touched point at the high detection frequency. For example, the method 100 may proceed back to step 150. On the other hand, when the determination in the step 170 is affirmative, the detection frequency is changed from the high detection frequency to the low detection frequency, and the touch panel detects the next touch coordinate at the low detection frequency. For instance, the method 100 may proceed back to step 120. In other words, when the determination in the step 170 is negative, the method 100 repeats the step 150 to the step 170 so that the position of the touched point is detected at the high detection frequency. The step 150 to step 170 may be more particularly illustrated by FIG. 1C, when the distance between the touch coordinates ($x_3,y_3$) and ($x_4,y_4$) is not less than the second threshold distance, the touch panel detects the next position of the touched point at the high detection frequency of the step 150 so as to obtain the touch coordinate ($x_5,y_5$) at the fifth time point 05. Thereafter, the method 100 proceeds the step 160 and the step 170. When the distance between the touch coordinate ($x_7,y_7$) at the seventh time point 07 and the touch coordinate ($x_8,y_8$) at the eighth time point 08 is less than the second threshold distance, the detection frequency is changed from the high detection frequency to the low detection frequency, and the touch panel detects the touched point at the ninth time point 09 in accordance with the low detection frequency, and thereby obtaining the touch coordinate ($x_9, y_9$).

In one embodiment, when the touch panel detects the touched point in the step 150 and the detection result indicates that no touched point is appeared on the touch panel, the method 100 proceeds back to the step 120. In another embodiment, when the touch panel is turned off, the method 100 is ended.

Figure 2A:
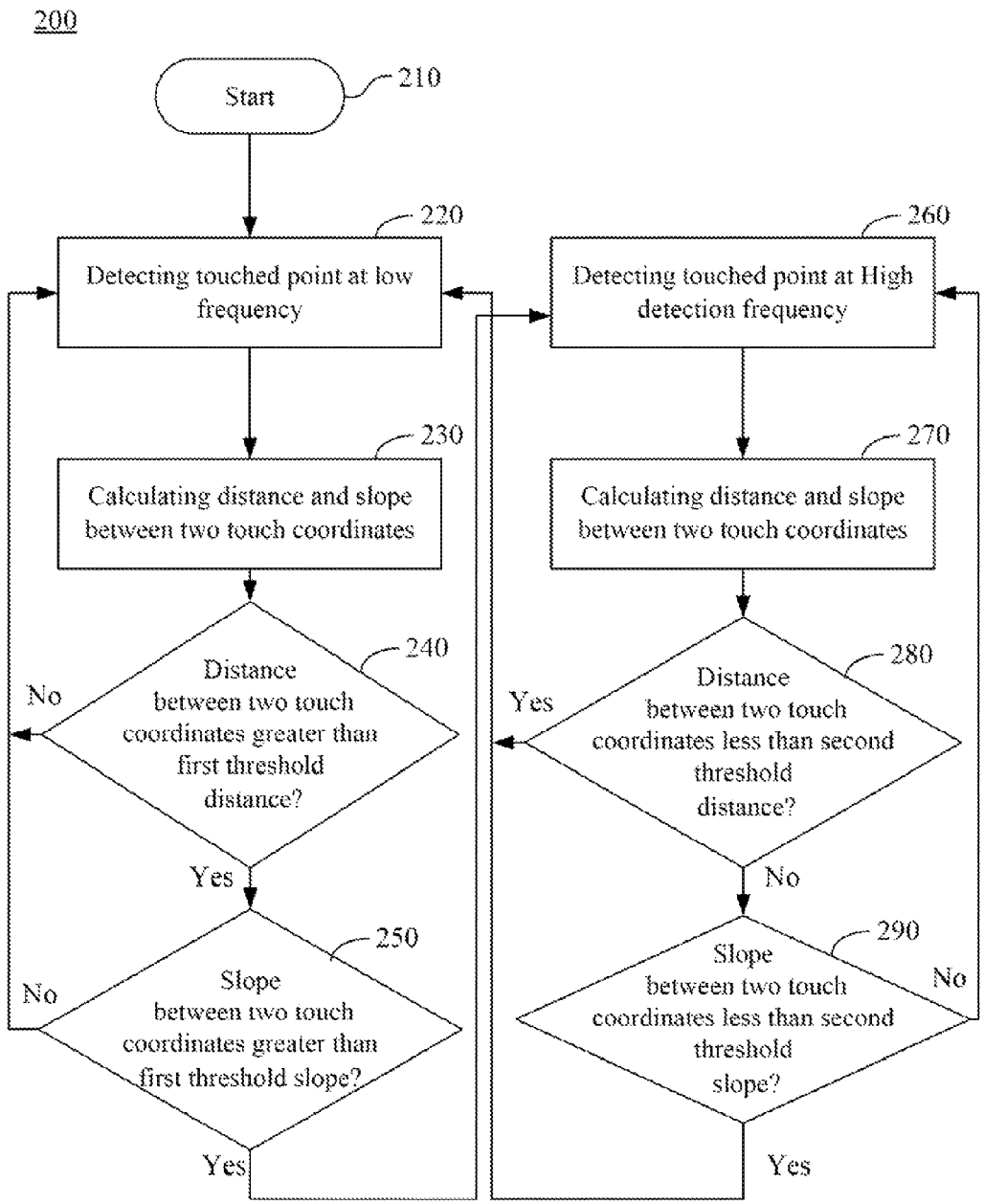
FIG. 2A is a flow chart showing a method for sampling coordinates of a touched point on a touch panel according to another embodiment of the present disclosure.

FIG. 2A is a flow chart showing a method 200 for sampling coordinates of a touched point on a touch panel according to another embodiment of the present disclosure. The method 200 begins at step 110, which may a step of turning on the touch panel, for example.

Subsequently, the method 200 proceeds to step 220 to detect a touched point on the touch panel at a low detection frequency so as to obtain two touch coordinates sequentially in time series. Other features and embodiments of the step 220 may be the same as these described hereinbefore in connection with the step 120 of the method 100.

The method 200 proceeds to step 230 to calculate the distance and the slope between the two touch coordinates obtained at the low detection frequency. It is noted that the term slope in this specification has a different definition from the typical definition of slope in mathematics. The slope m between point A and point B in this specification is defined by the following formula (II), in which the coordinate of point A is (a1,a2) and the coordinate of point B is (b1,b2), $$\text{when } |\Delta x| \geq |\Delta y|,$$
$$m = \frac{|\Delta y|}{|\Delta x|};$$
$$\text{when } |\Delta x| < |\Delta y|,$$
$$m = \frac{|\Delta x|}{|\Delta y|};$$

formula (II);

in which $\Delta x = b1-a1$; $\Delta y = b2-a2$.

Figure 2B:
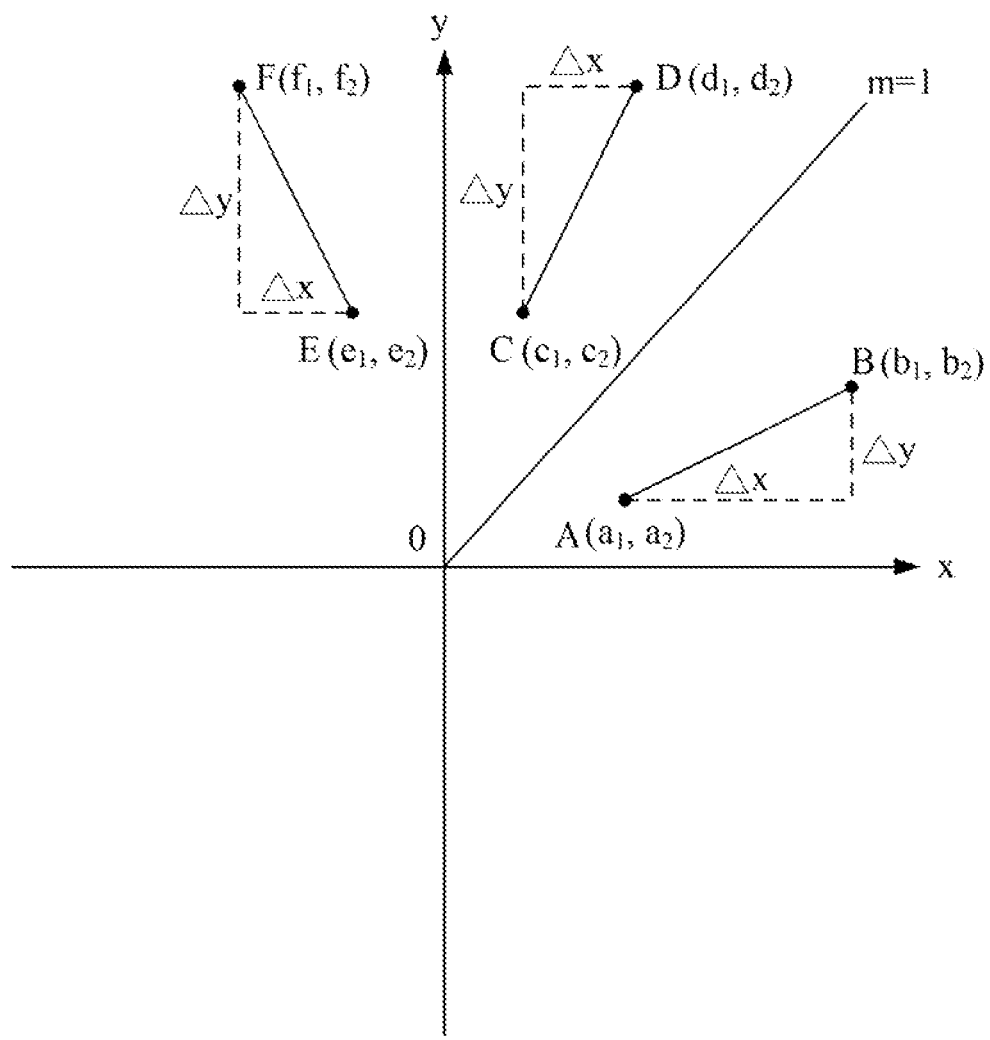
FIG. 2B is a diagram illustrating the definition of the slope is in this specification.

With reference to FIG. 2B, the definition of the slope is illustrated to go into particulars. In FIG. 28, between point A and point B, $|\Delta x| \geq |\Delta y|$ is satisfied, so that the slope m between point A and point B is represented by:

$$m = \frac{|\Delta y|}{|\Delta x|} = \frac{|b2-a2|}{|b1-a1|};$$

Between point C (c1,c2) and point D (d1,d2), $|\Delta x|<|\Delta y|$ is satisfied, so that the slope m between point C and point D is represented by:

$$m = \frac{|\Delta x|}{|\Delta y|} = \frac{|d1-c1|}{|d2-c2|};$$

Between point E (e1,e2) and point F (f1,f2), $|\Delta x|<\oplus\Delta y|$ is satisfied so that the slope m between point E and point F is represented by:

$$m = \frac{|\Delta x|}{|\Delta y|} = \frac{|f1-e1|}{|f2-e2|}$$

Accordingly, the slope in this specification has a maximum of 1 and a minimum of 0. The slope defined by the formula (II) provides several advantages. Particularly, the definition of the slope in typical mathematics has an indefinite situation such as infinities ±∞, and it causes a serious trouble in the subsequent calculation. In addition, according to the definition of the slope in typical mathematics, when a line segment between point A and point B is approximately parallel with y axis in Cartesian coordinate system, diminutive errors in positions of point A and/or point B cause a significant variation in the slope between point A and point B, and thus the measures of the slope loses its value. Therefore, in the present specification, the slope is defined by the formula (II) for the purpose of avoiding the problems described above.

In step 240, a determination is made as to whether or not the distance between the two touch coordinates sequentially in time series at the low detection frequency is greater than a first threshold distance. The embodiments of the step 240 may be the same as these described above in connection with the step 140. When the determination in the step 240 is affirmative, the method 200 proceeds to step 250. On the other hand, when the determination in the step 240 is negative, the method 200 does not proceed to step 250. In this situation, the touch panel detects the position of the touched point at the low detection frequency continuously. For instance, method 200 may proceed back to the step 220.

The method 200 proceeds to step 250 to determine whether or not the slope calculated in the step 230 is greater than a first threshold slope. In one embodiment, the first threshold slope is about 0.2 to about 0.4. When the determination in the step 250 is negative, the touch panel detects the position of the touched point at the low detection frequency continuously. For example, the method 200 proceeds back to the step 220 When the determination in the step 250 is affirmative, the method 200 proceeds to step 280.

The method 200 proceeds to step 260 to detect the touched point at a high detection frequency, and thus obtaining a subsequent touch coordinate in time series.

The method 200 proceeds to step 270 to calculate the distance and the slope between two touch coordinates sequentially in time series at the high detection frequency. The slope in the step 270 has a definition the same as these described above in connection with the step 230. Other features and embodiments of the step 270 may be the same as these described in the step 230.

The method 200 proceeds to step 280 to determine whether or not the distance between the two touch coordinates sequentially in time series at the high detection frequency is less than a second threshold distance. The second threshold distance is less than the first threshold distance described in the step 240. The embodiments of the step 280 may be the same as these described in the step 170. When the determination in the step 280 is affirmative, the detection frequency of the touch panel is changed to the low detection frequency from the high detection frequency, and the touch panel detects the next touch coordinate at the low detection frequency. For instance, the method 200 may proceed back to step 220. On the other hand, when the determination in the step 280 is negative, the method 200 proceeds to step 290.

In step 290, a determination is made as to whether the slope calculated in the step 270 is less than a second threshold slope. The second threshold slope is less than the first threshold slope. In one embodiment, the second threshold slope is about 0.1 to about 0.3. When the determination in the step 270 is affirmative. the detection frequency of the touch panel is changed to the low detection frequency from the high detection frequency, and the touch panel detects the next touch coordinate at the low detection frequency. For example, the method 200 proceeds back to the step 220. On the other hands, when the determination in the step 290 is negative, the touch panel detects the next touch coordinate at the high detection frequency continuously. For example, the method 200 proceeds back the step 260.

According to the embodiments of the present disclosure, the second threshold distance is necessarily less than the first threshold distance, and this limitation is concluded from a number of experiments. When the second threshold distance is greater than or equal to the first threshold distance, the touch panel is frequently switched between the high detection frequency and the low detection frequency because of the practice and habit of users, and then the power consumption of the touch control device can not be reduced.

Furthermore, according to one embodiment of the present disclosure, the first threshold distance is about 5 to about 10 folds of the resolution pitch and the second threshold distance is about 2 to about 6 folds of resolution pitch. The ranges of the first and second threshold distances are critical. According to a number of experiments and analysts, when the first and the second threshold distances are respectively in the ranges of about 5-10 folds and about 2-6 folds of the resolution pitch, the method disclosed in this specification is able to successfully distinguish whether users are writing information on the touch panel or users are simply sliding fingers up/down on the touch panel, and the probability of success is about 90%.

In addition, according to another embodiment of the present disclosure, the first threshold slope and the second threshold slope are respectively about 0.2 to about 0.4 and about 0.1 to about 0.3. The ranges of the first and second threshold slopes are critical. According to a number of experiments and analysts, when the first and the second threshold distances are respectively about 0.2 to about 0.4 and about 0.1 to about 0.3, the method disclosed in this specification is able to successfully distinguish whether users are writing information on the touch panel or users are simply sliding fingers up/down on the touch panel, and the probability of success is about 95%.

Figure 3A:
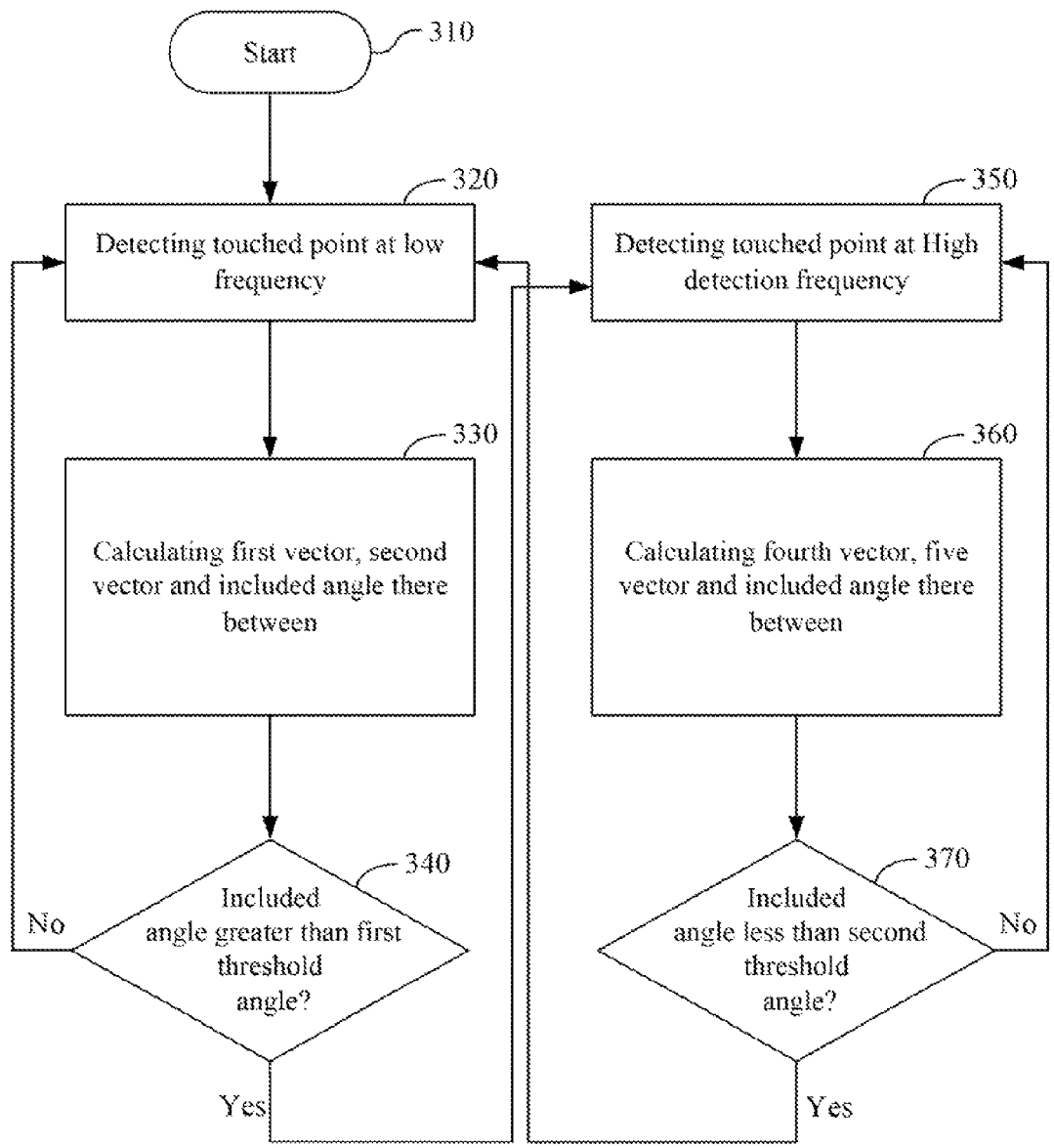
FIG. 3A is a flow chart showing a method for sampling coordinates of a touched point on a touch panel according to still another embodiment of the present disclosure.

FIG. 3A is a flow chart showing a method 300 for sampling coordinates of a touched point on a touch panel according to another embodiment of the present disclosure. The method 300 begins at step 310, which may be a step of turning on the touch panel, for example.

Subsequently, the method 300 proceeds to step 320 to detect a touched point on the touch panel at a low detection frequency so as to obtain a first, a second and a third touch coordinate sequentially in time series. For example, as illustrated in FIG. 1C, the first, second and third touch coordinates may be respectively the touch coordinate $(x_1,y_1)$ at the first time point 01, the touch coordinate $(x_2,y_2)$ at the second time point 02 and the touch coordinate $(x_3,y_3)$ at the third time point 03.

Figure 3B:
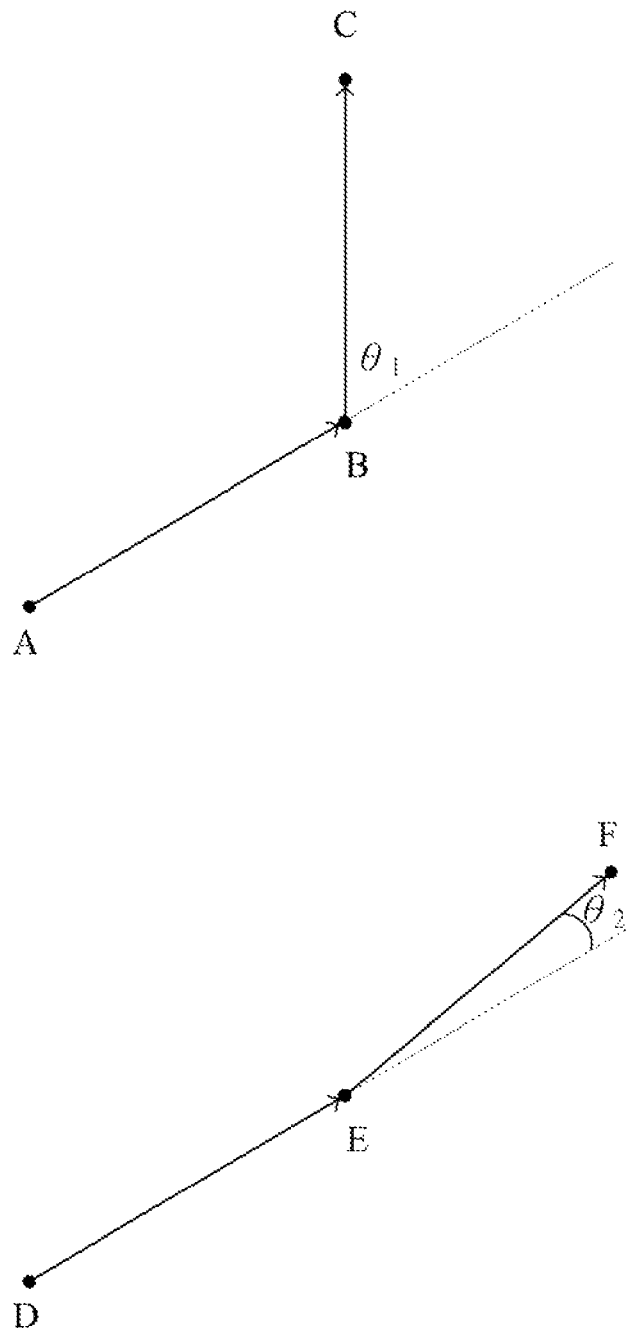
FIG. 3B is a diagram illustrating the first vector, the second vector and an included angle there between in method 300 illustrated in FIG. 3A.

The method 300 proceeds to step 330 to calculate a first vector between the first coordinate and the second coordinate, a second vector between the second coordinate and the third coordinate, and an included angle between the first and the second vectors at the low detection frequency. Particularly, as illustrated in FIG. 3B, the arrow between point A and point B represents the first vector between the first touch coordinate (i.e. point A) and the second touch coordinate (i.e. point B). The arrow between point B and point C represents the second vector between the second touch coordinate (i.e. point B) and the third touch coordinate (i.e. point C). The included angle between the two vectors is indicated as $\theta_1$ in FIG. 36.

The method 300 proceeds to step 340 to determine whether the included angle between the two vectors calculated in step 330 is greater than a first threshold angle. In one embodiment, the first threshold angle is about 15 degrees to about 30 degrees. When the determination in step 340 is negative, the touch panel detects the position of the touched point at the low detection frequency continuously. For example, the method 300 proceeds back to the step 320. On the other hand, when the determination in the step 340 is affirmative, the method 300 proceeds to step 350.

In step 350, a touched point is detected at a high detection frequency, and thus obtaining a fourth, a fifth and a sixth touch coordinate sequentially in time series. For instance, as illustrated in FIG. 1C, the fourth, fifth and sixth touch coordinates may be respectively the touch coordinate $(x_4,y_4)$ at the fourth time point 04, the touch coordinate $(x_5,y_5)$ at the fifth time point 05 and the touch coordinate $(x_6,y_6)$ at the sixth time point 06.

Thereafter, the method 300 proceeds to step 360 to calculate a fourth vector between the fourth coordinate and the fifth coordinate, a fifth vector between the fifth coordinate and the sixth coordinate, and an included angle between the fourth and the fifth vectors at the high detection frequency. As illustrated in FIG. 3B, the arrow between point D and point E represents the fourth vector between the fourth touch coordinate (i.e. point D) and the fifth touch coordinate (i.e. point E). The arrow between point E and point F represents the fifth vector between the fifth touch coordinate (i.e. point E) and the sixth touch coordinate (i.e. point F). The included angle between the two vectors is indicated as $\theta_2$ in FIG. 3B.

The method 300 proceeds to step 370 to determine whether the included angle between the fourth and fifth vectors calculated in the step 360 is less than a second threshold angle. The second threshold angle is less than the first threshold angle in the step 340. In one example, the second threshold angle is about 5 degrees to about 15 degrees. When the determination in step 370 is negative, the touch panel detects the position of the touched point at the high detection frequency continuously. For example, the method 300 proceeds back to the step 350. On the other hand, when the determination in the step 370 is affirmative, the detection frequency is changed to the low detection frequency from the high detection frequency, and the touch panel detects the touched point at the low detection frequency. For example, the method 300 proceeds back to the step 320.

In one embodiment of the present disclosure, the first threshold angle and the second threshold angle are respectively about 15-30 degrees and about 5-15 degrees, and the ranges of the first and second threshold angles are critical. According to a number of experiments and analysts, when the first and the second threshold angles are respectively in the ranges of about 15-30 degrees and about 5-15 degrees, the method disclosed herein is able to successfully distinguish whether users are writing information on the touch panel or users are simply sliding fingers up/down on the touch panel, and the probability of success is over 97%.

Figure 4:
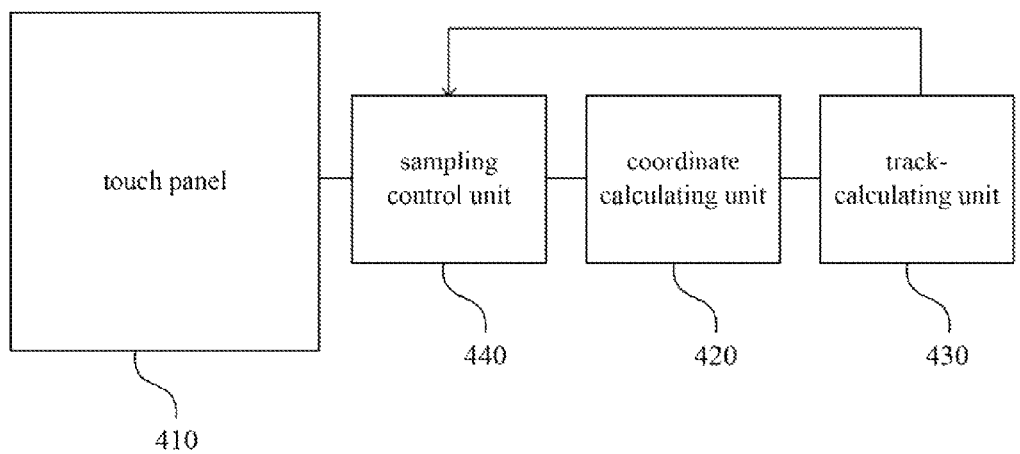
FIG. 4 is a block diagram illustrating a touch control device according to one embodiment of the resent disclosure.

According to another aspect of the present disclosure, a touch control device is provided. FIG. 4 is a block diagram illustrating a touch control device 400 according to one embodiment of the resent disclosure. The touch control device 400 includes a touch panel 410, a coordinate calculating unit 420, a track-calculating unit 430 and a sampling control unit 440. The touch panel 410 is configured to detect a touched point appeared thereon at a detection frequency so as to obtain a series of touch information in time series. The type of the touch information depends upon the type of the touch panel. For example, the touch information of resistive touch panels may be resistance or voltage drop. The touch information of optical touch panels may be photocurrent. The touch panel 410 may be an embedded type or an add-on type touch panel. In one example, the touch panel includes a liquid crystal display panel and a resistive touch screen disposed thereon. In another example, the touch panel 410 is a liquid crystal display panel having a position detecting element embedded therein.

The coordinate calculating unit 420 is capable of calculating a series of touch coordinates according to the series of touch information provided by the touch panel 410.

The track-calculating unit 430 is capable of calculating a distance between two touch coordinates, sequentially in time series, in the series of the touch coordinates. In one embodiment, the track-calculating unit 430 further includes a slope calculating element (not shown) for calculating the slope between two touch coordinates sequentially in time series. In another embodiment, the track-calculating unit 430 further includes a vector calculating element (not shown) for calculating the vectors and the included angle described above in connection with the method 300.

The sampling control unit 440 is configured to modulate the detection frequency of the touch panel according to the distance or other information such as the slope, the vector, and the included angle calculated by the track-calculating unit. In particular, the sampling control unit 440 may control the touch panel 410 to detect the touched pointed at a low detection frequency or at a high detection frequency.

According to the embodiments disclosed herein, when the user inputs information by a single touch, or the motion of the touch point is an up/down (or left/right) slide on the touch panel or the moving speed of the touched point is slow, the touch control device decreases the frequency of detecting the touched point. The decrease in the frequency of detecting the touched point implies the decrease in the number of times that the electronics operate calculation, and the power consumption is decreased. On the other hand, when the input paths of motion of the touched point is complicated, or the moving speed of the touched point is fast, the touch control device increase the frequency of detecting the touched point to precisely catch the input information.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for sampling coordinates of a touched point on a touch panel, comprising:
   (a1) detecting a touched point on a touch panel at a low detection frequency to obtain two touch coordinates sequentially in time series;
   (a2) calculating a distance between the two touch coordinates at the low detection frequency;
   (a3) determining whether the distance between the two touch coordinates at the low detection frequency is greater than a first threshold distance;
   (a4) detecting a touched point on the touch panel at a high detection frequency to obtain a subsequent touch coordinate in time series when the distance is greater than the first threshold distance in the step (a3);
   (a5) calculating a distance between two touch coordinates sequentially in time series at the high detection frequency;
   (a6) determining whether the distance obtained in the step (a5) is less than a second threshold distance, wherein the second threshold distance is less than the first threshold distance; and (a7) detecting a touched point on the touch panel at the low detection frequency when the distance is less than the second threshold distance in the step (a6).

2. The method according to claim 1, wherein the touch panel has a resolution pitch, and the first threshold distance is about 5 folds to about 10 folds of the resolution pitch.

3. The method according to claim 1, wherein the touch panel has a resolution pitch, and the second threshold distance is about 2 folds to about 6 folds of the resolution pitch.

4. The method according to claim 1, wherein the low detection frequency is about 50 $s^{-1}$ to about 150 $s^{-1}$, and the high detection frequency 150 $s^{-1}$ to about 300 $s^{-1}$.

5. A method for sampling coordinates of a touched point on a touch panel, comprising:
(b1) detecting a touched point on a touch panel at a low detection frequency to obtain two touch coordinates sequentially in time series;
(b2) calculating a distance and a slope between the two touch coordinates at the low detection frequency;
(b3) determining whether the distance between the two touch coordinates at the low detection frequency is greater than a first threshold distance;
(b4) determining whether the slope at the low detection frequency is greater than a first threshold slope when the distance at the low detection frequency is greater than the first threshold distance;
(b5) detecting a touched point on the touch panel at a high detection frequency to obtain a subsequent touch coordinate in time series when the slope at the low detection frequency is greater than the first threshold slope:
(b6) calculating a distance and a slope between two touch coordinates sequentially in time series at the high detection frequency; and
(b7) determining whether the distance between the two touch coordinates at the high detection frequency is less than a second threshold distance;
(b8) detecting a touched point on the touch panel at the low detection frequency when the distance between the two touch coordinates at the high detection frequency is less than a second threshold distance;
(b9) determining whether the slope at the high detection frequency is less than a second threshold slope when the distance between the two touch coordinates at the high detection frequency is not less than a second threshold distance; and
(b10) detecting a touched point on the touch panel at the low detection frequency when the slope at the high detection frequency is less than the second threshold slope.

6. The method according to claim 5, wherein the first threshold slope is about 0.2 to about 0.4.

7. The method according to claim 5, wherein the second threshold slope is about 0.1 to about 0.3.

8. A method for sampling coordinates of a touched point on a touch panel, comprising:
(c1) detecting a touched point on a touch panel at a low detection frequency to obtain a first, a second and a third touch coordinate sequentially in time series;
(c2) calculating a first vector between the first coordinate and the second coordinate, a second vector between the second coordinate and the third coordinate, and an included angle between the first and the second vectors at the low detection frequency;
(c3) determining whether the included angle at the low detection frequency in the step (c2) is greater than a first threshold angle;
(c4) detecting a touched point on the touch panel at a high detection frequency to obtain a fourth, a fifth and a sixth touch coordinate sequentially in time series when the included angle at the low detection frequency is greater than a first threshold angle;
(c5) calculating a fourth vector between the fourth coordinate and the fifth coordinate, a fifth vector between the fifth coordinate and the sixth coordinate, and an included angle between the fourth and the fifth vectors at the high detection frequency;
(c6) determining whether the included angle at the high detection frequency in the step (c5) is less than a second threshold angle, wherein the second threshold angle is less than the first threshold angle; and
(c7) detecting a touched point on the touch panel at the low detection frequency when the included angle at the high detection frequency is less than the second threshold angle.

9. The method according to claim 8, wherein the first threshold angle is about 15 degrees to about 30 degrees, and the second threshold angle is about 5 degrees to about 15 degrees.

10. A touch control device, comprising:
a touch panel for detecting a touched point appeared thereon at a detection frequency to obtain a series of touch information in time series;
a coordinate calculating unit for calculating a series of touch coordinates in accordance with the series of touch information;
a track-calculating unit for calculating a distance between two touch coordinates, sequentially in time series, in the series of the touch coordinates; and
a sampling control unit for modulating the detection frequency of the touch panel in accordance with the distance obtained by the track-calculating unit.

* * * * *